(12) United States Patent
Lee et al.

(10) Patent No.: US 12,562,655 B2
(45) Date of Patent: Feb. 24, 2026

(54) DEVICE AND METHOD FOR CONTROLLING INVERTER

(71) Applicants: Hyundai Motor Company, Seoul (KR); Kia Corporation, Seoul (KR)

(72) Inventors: Seong Min Lee, Seoul (KR); Sangcheol Shin, Suwon-si (KR); Yeongju Goh, Suncheon-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 274 days.

(21) Appl. No.: 18/098,276

(22) Filed: Jan. 18, 2023

(65) Prior Publication Data

US 2024/0128891 A1     Apr. 18, 2024

(30) Foreign Application Priority Data

Oct. 13, 2022     (KR) ........................ 10-2022-0131803

(51) Int. Cl.
H02M 7/5387        (2007.01)
H02M 1/00          (2006.01)

(52) U.S. Cl.
CPC ..... *H02M 7/53871* (2013.01); *H02M 1/0009* (2021.05)

(58) Field of Classification Search
CPC .......................... H02M 7/5387; H02M 1/0009
See application file for complete search history.

(56) References Cited

U.S. PATENT DOCUMENTS

| | | | |
|---|---|---|---|
| 10,291,111 B1 * | 5/2019 | Rosado ............. | H02M 7/53873 |
| 2016/0373047 A1 * | 12/2016 | Loken ............... | H02M 7/53875 |
| 2017/0279377 A1 * | 9/2017 | Shimomugi ........... | H02M 7/48 |
| 2019/0310290 A1 * | 10/2019 | Araragi ................... | H02M 1/32 |

* cited by examiner

*Primary Examiner* — Alex Torres-Rivera
(74) *Attorney, Agent, or Firm* — MORGAN, LEWIS & BOCKIUS LLP

(57)        ABSTRACT

A device for controlling an inverter controls the inverter including at least one switching module including a plurality of switching elements connected in parallel, detects current flowing through the plurality of switching elements, determines duty cycles of a plurality of switching mode power supplies (SMPSs) corresponding to the plurality of switching elements based on the detected plurality of currents, and controls a plurality of currents flowing through the plurality of switching elements according to the duty cycles of the plurality of SMPSs.

11 Claims, 6 Drawing Sheets

1

DEVICE AND METHOD FOR CONTROLLING INVERTER

CROSS-REFERENCE TO RELATED APPLICATION

The present application claims priority to Korean Patent Application No. 10-2022-0131803 filed on Oct. 13, 2022, the entire contents of which is incorporated herein for all purposes by this reference.

BACKGROUND OF THE PRESENT DISCLOSURE

Field of the Present Disclosure

The present disclosure relates to a device and method for controlling an inverter, and more particularly, to a device and method for controlling an inverter for resolving a current imbalance between a plurality of parallel-connected switching elements forming each switching module of an inverter.

Description of Related Art

To drive an AC motor of a vehicle, an inverter that converts a DC voltage of a high voltage battery into AC voltage is used.

The inverter utilizes at least one switching module to convert the DC voltage of the battery into the AC voltage for the motor.

To increase the output voltage of the inverter as the power performance of eco-friendly vehicles is increasingly required, parallel connection of a plurality of switching elements is commonly used inside each switching module.

However, the resistance component between paths according to the parallel connection of a plurality of switching elements varies due to parasitic components caused by mass production assembly deviations or hardware structure complexity. When a plurality of switching elements are connected in parallel, if the resistance component between the paths is not constant, a current imbalance phenomenon occurs in which the current is not evenly distributed among the plurality of switching elements connected in parallel, and due to the current imbalance, the voltage output to the motor of the vehicle is lowered and the reliability of the switching module is also reduced.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a device and method for controlling inverter for resolving current imbalance of a plurality of switching elements connected in parallel.

According to an exemplary embodiment of the present disclosure, a method for controlling an inverter including at least one switching module including a plurality of switching elements connected in parallel in a device configured for controlling the inverter is provided. The method for controlling an inverter includes: detecting current flowing through the plurality of switching elements; determining duty cycles of a plurality of switching mode power supplies (SMPSs) corresponding to the plurality of switching elements based on the detected plurality of currents; and controlling a plurality of currents flowing through the plurality of switching elements according to the duty cycles of the plurality of SMPSs.

The determining the duty cycles may include: reducing a duty cycle of a corresponding SMPS when an amount of current of a first switching element among the plurality of switching elements increases; and increasing a duty cycle of a corresponding SMPS when an amount of current of a second switching element among the plurality of switching elements decreases.

The controlling the plurality of currents may include: decreasing a gate voltage applied to a gate electrode of the first switching element according to the reduced duty cycle; and increasing a gate voltage applied to a gate electrode of the second switching element according to the increased duty cycle.

The determining the duty cycle may include: determining an average of the plurality of currents; determining a difference between the current of each switching element and the average; and controlling a duty cycle of an SMPS corresponding to each of the switching elements based on the difference between the current of each switching elements and the average.

The controlling the duty cycle of the SMPS corresponding to each of the switching elements may include: decreasing a duty cycle of an SMPS corresponding to a switching element in which the difference has a positive value; and increasing a duty cycle of an SMPS corresponding to a switching element in which the difference has a negative value.

According to another exemplary embodiment of the present disclosure, a device configured for controlling an inverter including at least one switching module including a plurality of switching elements connected in parallel is provided. The device configured for controlling an inverter includes: a plurality of switching mode power supplies (SMPSs) that correspond to the plurality of switching elements and control the plurality of switching elements; and a controller that detects a plurality of currents flowing through the plurality of switching elements, and is configured to control voltages applied to control electrodes of the plurality of switching elements through the plurality of SMPSs based on the plurality of currents.

The controller may be configured to generate a plurality of duty commands for controlling duty cycles of the plurality of SMPSs based on the plurality of currents, and the plurality of SMPSs may determine duty cycles according to the plurality of duty commands, and control voltages applied to the control electrodes of the plurality of switching elements according to the duty cycles.

The controller may be configured to generate a first duty command for reducing a duty cycle of a corresponding SMPS when an amount of current of a first switching element among the plurality of switching elements increases, and may generate a second duty command for increasing a duty cycle of a corresponding SMPS when an amount of current of a second switching element among the plurality of switching elements decreases.

The device configured for controlling an inverter may further include a comparator that determines an average of the plurality of currents and determines differences between the currents of the plurality of switching elements and the average, wherein the controller may be configured to generate the plurality of duty commands based on differences between the currents of the plurality of switching elements and the average.

The controller may be configured to generate a first duty command for decreasing a duty cycle of an SMPS corresponding to a first switching element in which the difference has a positive value among the plurality of switching elements, and may generate a second duty command for increasing a duty cycle of an SMPS corresponding to a second switching element in which the difference has a negative value among the plurality of switching elements.

The SMPS corresponding to the first switching element may decrease the voltage applied to the control electrode of the first switching element according to the reduced duty cycle in response to the first duty command, and the SMPS corresponding to the second switching element may increase the voltage applied to the control electrode of the first switching element according to the increased duty cycle in response to the second duty command.

According to the exemplary embodiment of the present disclosure, by resolving the current imbalance between a plurality of switching elements connected in parallel, the temperature rise of the switching module may be reduced, and the output performance of the inverter may be improved, and the size and cost of the inverter through reduction of the size of the switching module reduction is possible.

Furthermore, it is possible to improve the reliability level of the switching module and inverter by managing the current and temperature between a plurality of switching elements connected in parallel without deviation.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5 is a graph showing the current-voltage characteristics according to the gate voltage of the IGBT when the IGBT is turned on.

Figure 1:
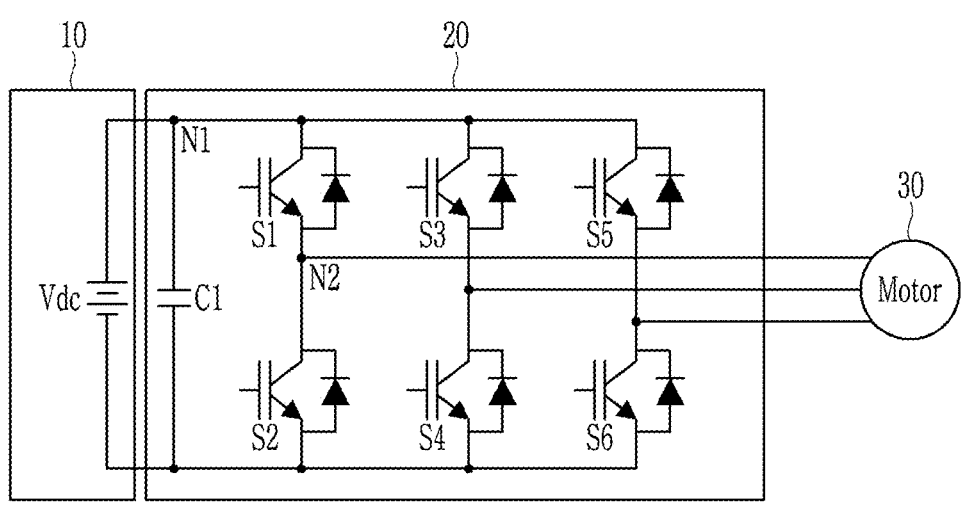
FIG. 1 is a diagram illustrating an example of an inverter to which the present disclosure is applied.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the appended drawings so that a person of ordinary skill in the art may easily implement the present disclosure. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

Throughout the specification, when an element is referred to be "connected" with another element, it includes not only the case where two elements are "directly connected" but also the case where two elements are "electrically or mechanically connected" with another component interposed therebetween.

In the present specification, terms including an ordinal number, such as first, second, etc., may be used to describe various elements, but the elements are not limited by the terms. The above terms are used only for distinguishing one element from another element. For example, without departing from the scope of the present disclosure, a first element may be referred to as a second element, and similarly, a second element may be referred to as a first element.

In the flowchart described with reference to the drawings in the present specification, the order of operations may be changed, several operations may be merged, some operations may be divided, and specific operations may not be performed.

Furthermore, in the present specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Now, a device and method for controlling an inverter according to an exemplary embodiment of the present disclosure will be described in detail with reference to the drawings.

FIG. 1 is a diagram illustrating an example of an inverter to which the present disclosure is applied.

Referring to FIG. 1, the inverter 20 is connected between a DC power supply 10 supplying a DC voltage Vdc and a motor 30.

A high voltage battery, which is a main battery of a vehicle, may be used as the DC power supply 10 for supplying the DC voltage Vdc.

The inverter 20 may include a capacitor C1 and at least one switching module S1 to S6.

The capacitor C1 temporarily stores energy from the DC power supply 10 and provides voltage stabilization during the operation period of the inverter 20.

The at least one switching module S1 to S6 converts the DC voltage Vdc received through the capacitor C1 into an AC voltage and transmits it to the motor 30.

One power module may be configured by use of at least one switching module S1 to S6, and the inverter 20 may be configured by use of at least one power module. For example, one inverter 20 may be configured by three power modules, and the three power modules include the switching modules S1 and S2, the switching modules S3 and S4, and the switching modules S5 and S6, respectively.

The switching modules S1 to S6 may be a switching module of an insulated gate bipolar transistor (IGBT) and a diode, or a switching module of a silicon carbide (SiC) MOSFET. Each of the at least one switching module S1 to S6 may be implemented in the form of a chip.

FIG. 1 shows the switching modules S1 to S6 including an IGBT element and a diode element as an inverter 20 for the motor 30 driven in a three-phase driving method, but this is an example and is not limited thereto.

The at least one switching module S1 to S6 is turned on or turned off according to a device configured for controlling the inverter control device to be described later.

Figure 2:
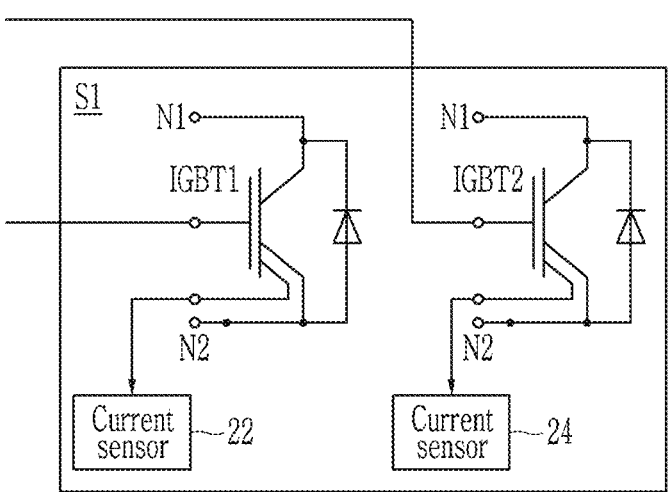
FIG. 2 is a diagram illustrating one switching module shown in FIG. 1.

FIG. 2 is a diagram illustrating one switching module shown in FIG. 1. FIG. 2 shows only one switching module S1 including two IGBTs connected in parallel for convenience of description, but the number of IGBTs is not limited thereto. Furthermore, the other switching modules S2 to S6 may also be configured the same or similar to the switching module S1.

Referring to FIG. 2, the switching module S1 may include IGBT1 and IGBT2 connected in parallel, and current sensors 22 and 24.

IGBT1 and IGBT2 are connected in parallel between node N1 and node N2. That is, the collector electrodes of the IGBT1 and IGBT2 are connected to the node N1, and the emitter electrodes of the IGBT1 and IGBT2 are connected to the node N2.

IGBT1 and IGBT2 are turned on or turned off according to the gate voltage applied to the gate electrodes, respectively.

The current sensors 22 and 24 are used to protect IGBT1 and IGBT2 from an overcurrent, respectively. The current sensors 22 and 24 measure the current flowing through IGBT1 and IGBT2, respectively.

In the present way, by connecting a plurality of IGBTs in parallel, the switching module S1 can provide higher power. The switching module made of SiC operates even at high temperatures and consumes less power, so energy efficiency can be increased, and since the chip size can be reduced compared to the existing silicon-based switching module, it can be easier to parallelize the switching module.

However, when the IGBT1 and IGBT2 are parallelized, the resistance component between the path through the IGBT1 from the DC power supply 10 and the path through the IGBT2 from the DC power supply 10 are different from each other. This causes current imbalance and temperature difference between IGBT1 and IGBT2.

Since the switching module S1 limits the output voltage in accordance with the IGBT of the high temperature, the motor 30 outputs low power compared to the actual output power due to current imbalance between paths.

That is, due to the current imbalance between paths through the IGBT1 and IGBT2 in the switching module S1, the output voltage of the inverter 20 is lowered, and thus the reliability of the inverter 20 is also reduced.

Therefore, it is necessary to improve the current imbalance between the IGBTs due to the parallelization of the IGBTs in the switching module S1.

Hereinafter, a device configured for controlling an inverter configured for resolving the current imbalance of IGBTs will be described.

Figure 3:
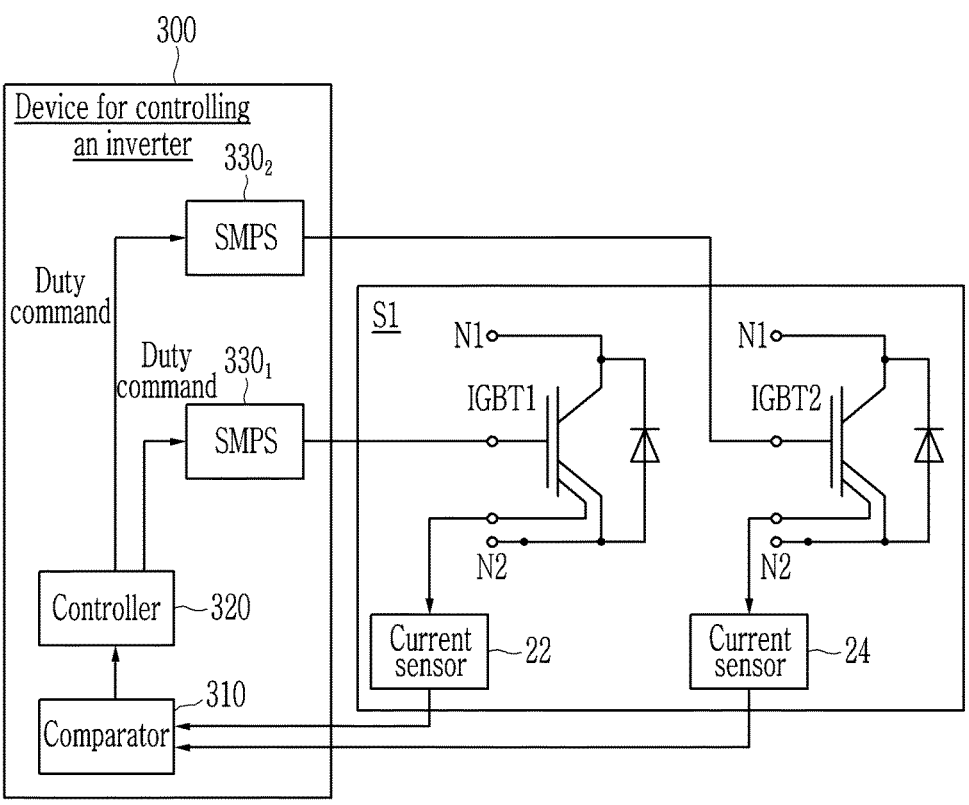
FIG. 3 is a diagram illustrating a device configured for controlling an inverter according to an exemplary embodiment of the present disclosure.

FIG. 3 is a diagram illustrating a device configured for controlling an inverter according to an exemplary embodiment of the present disclosure.

Referring to FIG. 3, the device configured for controlling an inverter 300 includes a comparator 310, a controller 320, and a plurality of switching mode power supplies (SMPSs) $330_1$ and $330_2$.

The comparator 310 receives the measured current amounts of IGBT1 and IGBT2 from the current sensors 22 and 24, and compares the current amounts of IGBT1 and IGBT2, respectively. The comparator 310 may determine the average value of the current amounts of IGBT1 and IGBT2, compare the current amount and the average value of each IGBT1 and IGBT2, and determine the difference between the current amount of each IGBT1 and IGBT2 and the average value.

The controller 320 is configured to control the duty cycles of the SMPSs $330_1$ and $330_2$ for applying a gate voltage to the gate electrodes of each IGBT1 and IGBT2 based on the comparison result of the current amount of each IGBT1 and IGBT2. In an exemplary embodiment of the present disclosure, the IGBT is described as an example and is described as a gate electrode, but the term may vary in accordance with the type of the switching element, and the gate electrode may be referred to as a control electrode of the switching element.

The controller 320 generates duty commands for controlling the duty cycles of the SMPSs $330_1$ and $330_2$ corresponding to each IGBT1 and IGBT2 based on the difference between the current amount of each IGBT1 and IGBT2 and the average value, and transmits the duty commands to the SMPSs $330_1$ and $330_2$.

For example, if the difference between the amount of current of IGBT1 and the average value has a positive value, it means that the amount of current of IGBT1 is greater than that of IGBT2. In the instant case, the controller 320 transmits a duty command for reducing the duty cycle of the corresponding SMPS $330_1$ to the SMPS $330_1$ to reduce the amount of current of the IGBT1. The SMPS $330_1$ reduces the duty cycle according to the received duty command, and applies a gate voltage to the gate electrode of the IGBT1 based on the reduced duty cycle.

Similarly, if the difference between the amount of current of one IGBT2 and the average value has a negative value, it means that the amount of current of IGBT2 is smaller than that of the other IGBT1. In the instant case, the controller 320 transmits a duty command for increasing the duty cycle of the corresponding SMPS $330_2$ to the SMPS $330_2$ to increase the amount of current of the IGBT2. The SMPS $330_2$ increases the duty cycle according to the received duty command, and applies a gate voltage to the gate electrode of the IGBT2 based on the increased duty cycle.

The controller 320 may be a Proportional-Integral (PI) controller.

Furthermore, the controller 320 may be, for example, one or more microprocessors operated by a program or hardware including the microprocessor, and the program may include a series of commands for performing the method for controlling an inverter. The commands may be stored in a memory of the device for controlling an inverter 300 or the controller 320.

The plurality of SMPSs 330₁ and 330₂ correspond to IGBT1 and IGBT2, respectively. Accordingly, the device configured for controlling an inverter 300 includes independent SMPSs 330₁ and 330₂ for each IGBT.

The plurality of SMPSs 330₁ and 330₂ control turn on or turn off operations of the corresponding IGBT1 and IGBT2 based on the duty cycles of the SMPSs 330₁ and 330₂ according to the duty commands of the controller 320. The plurality of SMPSs 330₁ and 330₂ adjust gate voltages applied to the corresponding gate electrodes of the IGBT1 and IGBT2 based on the duty cycles of the SMPSs 330₁ and 330₂ according to the duty commands of the controller 320.

A path to IGBT1 is referred to as a first path, a path to IGBT2 is referred to as a second path, and as a result of measuring the current amounts of IGBT1 and IGBT2, when a large amount of current flows through the first path and a small amount of current flows through the second path, the controller 320 transmits a duty command to reduce the duty cycle of the SPMS 330₁ corresponding to IGBT2 to the SPMS 330₁, and transmits a duty command to increase the duty cycle of the SPMS 330₂ corresponding to IGBT2 to the SPMS 330₂.

When the duty cycle of the SPMS 330₁ corresponding to the IGBT1 is reduced, a current reduction process configured for reducing the amount of current flowing through the first path is performed. That is, if the duty cycle of the SPMS 330₁ corresponding to the IGBT1 is reduced, the gate voltage of the IGBT1 is lowered, the voltage between the collector electrode and the emitter electrode of the IGBT1 is increased, and the amount of current flowing through the first path is reduced.

Conversely, when the duty cycle of the SPMS 330₂ corresponding to the IGBT2 is increased, a current increasing process configured for increasing the amount of current flowing through the second path is performed. That is, when the duty cycle of the SPMS 330₂ corresponding to the IGBT2 is increased, the gate voltage of the IGBT2 increases, the voltage between the collector electrode and the emitter electrode of the IGBT2 decreases, and the amount of current flowing through the second path increases.

By repeating these operations, the imbalance of currents output from the IGBT1 and IGBT2 may be resolved.

Figure 4:
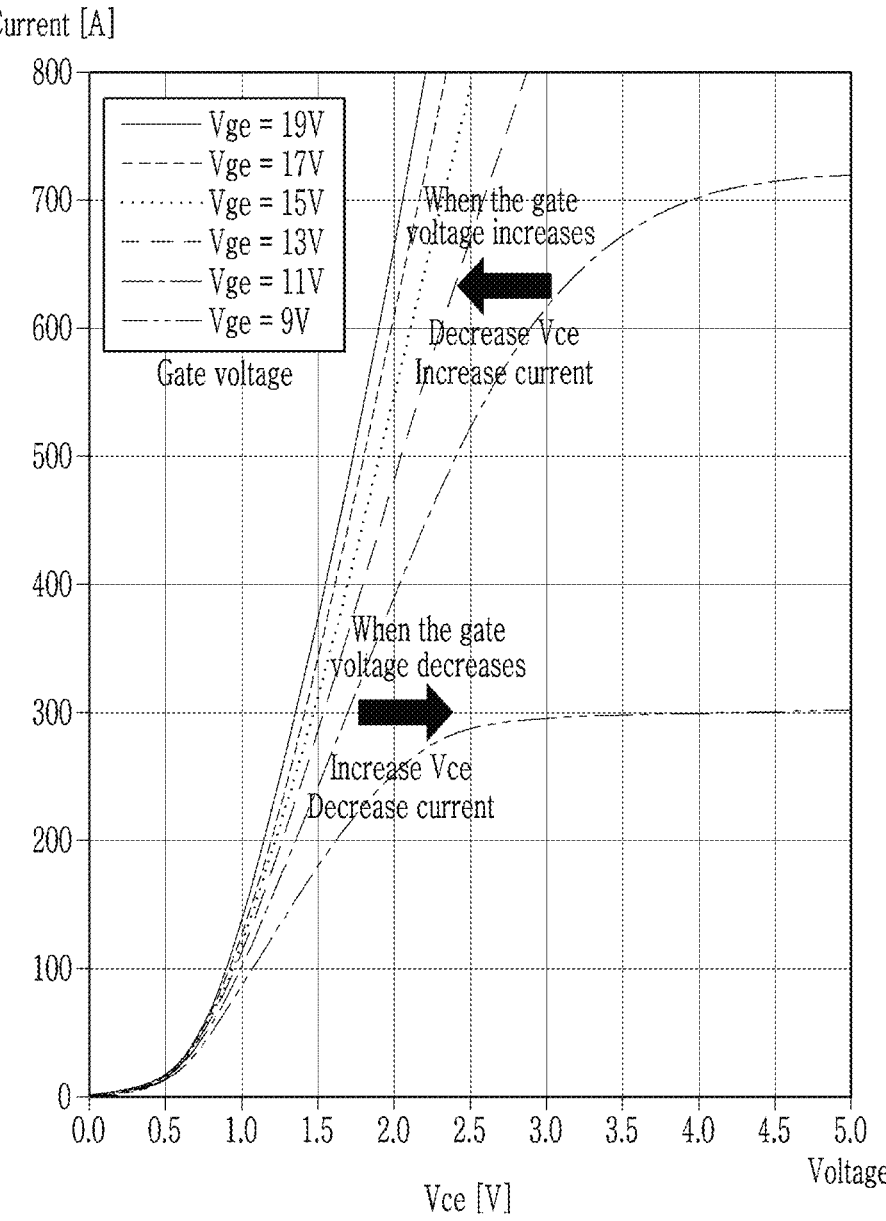
FIG. 4 is a graph showing an IGBT characteristic curve.

FIG. 4 is a graph showing an IGBT characteristic curve, and shows the relationship between the gate voltage of the IGBT, the voltage between the collector electrode and the emitter electrode of the IGBT, and the current of the IGBT.

Referring to FIG. 4, under the condition of the same voltage Vce between the collector electrode and the emitter electrode, the IGBT current flowing through the IGBT increases as the voltage Vge between the gate electrode and the emitter electrode increases.

Conversely, under the condition of the same voltage Vce between the collector electrode and the emitter electrode, as the voltage Vge between the gate electrode and the emitter electrode voltage decreases, the IGBT current flowing through the IGBT decreases.

Figure 5:
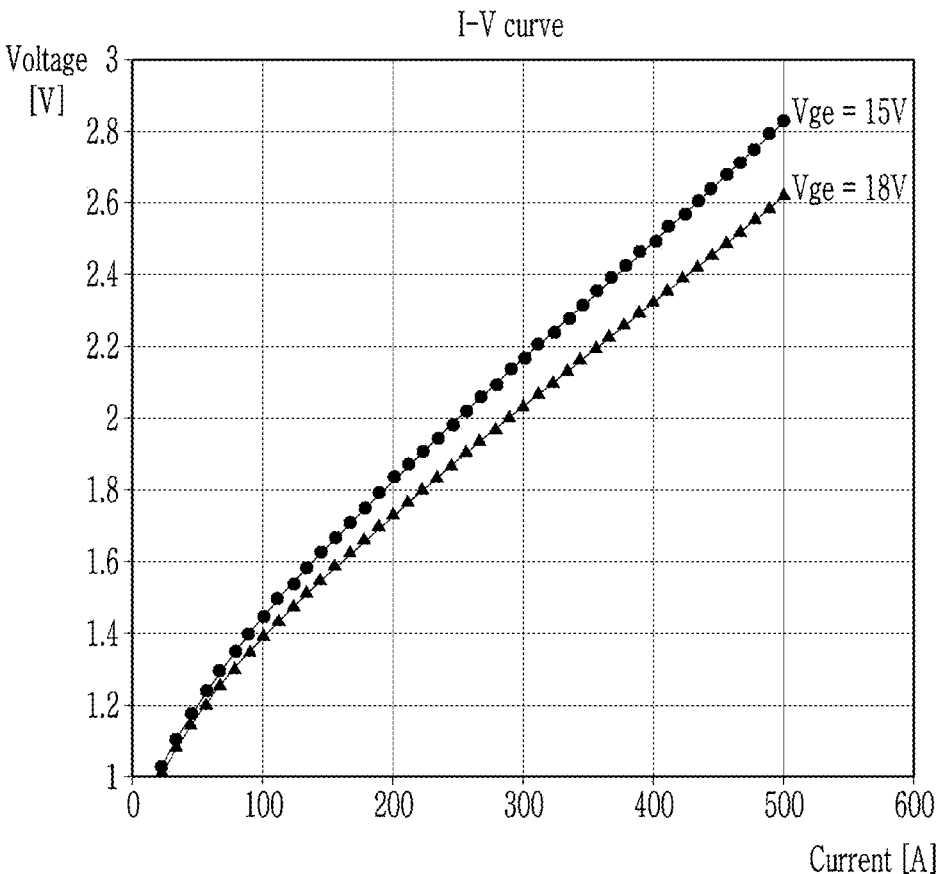

FIG. 5 is a graph showing the current-voltage characteristics according to the gate voltage of the IGBT when the IGBT is turned on. FIG. 5 shows current-voltage (I-V) curves when the voltages Vge among a plurality of voltages Vge between gate electrodes and the emitter electrodes are 18 V and 15 V.

As shown in FIG. 5, it may be seen that the IGBT current when the voltage Vge between the gate electrode and the emitter electrode of the IGBT is 18 V is greater than the IGBT current when the voltage Vge is 15 V under the same voltage Vce condition of the IGBT. That is, it may be seen that the IGBT current increases when the gate voltage increases.

In the graph of FIG. 5, it may be seen that when the voltages Vge between the gate electrode and the emitter electrode are 18 V and 15 V under the same IGBT current condition, the difference between the voltage Vce between the collector electrode and the emitter electrode is in the range of 0 to 0.2 V.

The controller 320 generates duty commands for controlling the duty cycles of the SMPSs 330₁ and 330₂ corresponding to IGBT1 and IGBT2, respectively, based on the current amounts of IGBT1 and IGBT2, by use of the characteristics of the IGBT shown in FIG. 4 and FIG. 5. The SMPSs 330₁ and 330₂ respectively corresponding to IGBT1 and IGBT2 control currents output from IGBT1 and IGBT2 by adjusting the gate voltages of IGBT1 and IGBT2 based on the duty cycles according to the corresponding duty commands, respectively.

Figure 6:
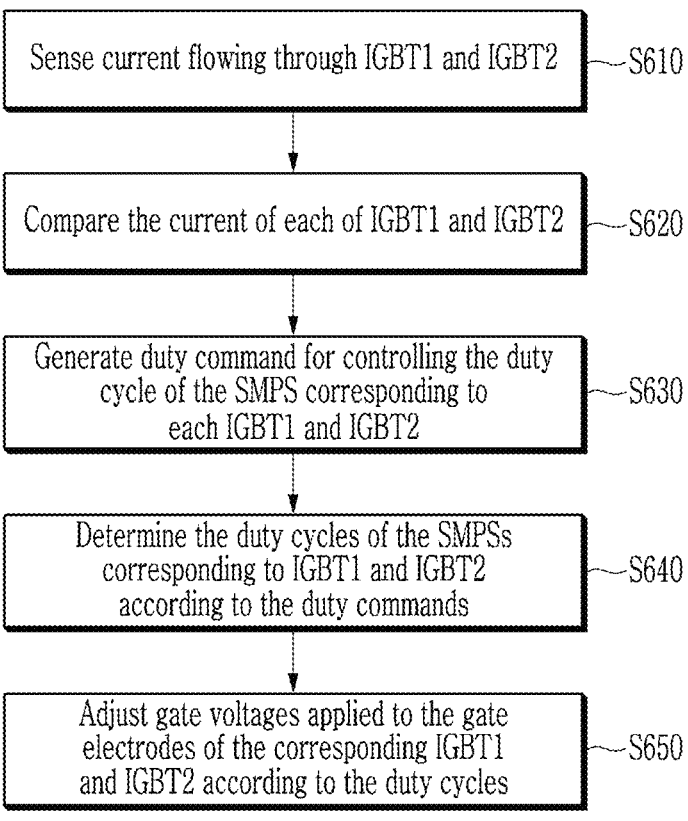
FIG. 6 is a flowchart illustrating a method for controlling an inverter according to an exemplary embodiment of the present disclosure.

FIG. 6 is a flowchart illustrating a method for controlling an inverter according to an exemplary embodiment of the present disclosure.

Referring to FIG. 6, a device configured for controlling an inverter 300 detects a current flowing through IGBT1 and IGBT2 (S610). The device configured for controlling an inverter 300 may receive current amounts of IGBT1 and IGBT2 measured from the current sensors 22 and 24 of IGBT1 and IGBT2.

The device configured for controlling an inverter 300 compares the current amounts of each IGBT1 and IGBT2 (S620).

The device configured for controlling an inverter 300 generates duty commands for controlling the duty cycles of the SMPSs 330₁ and 330₂ corresponding to IGBT1 and IGBT2, respectively, based on the comparison result of the current amount of each IGBT1 and IGBT2 (S630). The device configured for controlling an inverter 300 determines the average value of the current amount of each IGBT1 and IGBT2, and may generate duty commands for controlling the duty cycles of the SMPSs 330₁ and 330₂ corresponding to IGBT1 and IGBT2 in response to the differences between the current amount of each IGBT1 and IGBT2 and the average value. The device configured for controlling an inverter 300 may generate a duty command for reducing the duty cycle of the SMPS corresponding to the IGBT having a large amount of current, and may generate a duty command for increasing the duty cycle of the SMPS corresponding to the IGBT having a small amount of current.

The device configured for controlling an inverter 300 determines the duty cycles of the SMPSs 330₁ and 330₂ corresponding to IGBT1 and IGBT2 according to the duty commands (S640), and adjusts the gate voltages applied to the gate electrodes of the corresponding IGBT1 and IGBT2 according to the determined duty cycles, respectively (S650).

The device configured for controlling an inverter 300 may repeat steps S610 to S650 until the current amounts of IGBT1 and IGBT2 become the same.

In the present way, the device configured for controlling an inverter 300 repeats steps S610 to S650 until the current amounts of IGBT1 and IGBT2 become a same based on the current amounts of IGBT1 and IGBT2, equalizing the amount of current flowing through the parallel connected IGBT1 and IGBT2, and finally, the current imbalance problem of IGBT1 and IGBT2 connected in parallel may be solved.

At least some of the method for controlling an inverter according to an exemplary embodiment of the present disclosure may be implemented as a program or software executed in a computing device, and the program or software may be stored in a computer-readable medium.

Furthermore, at least some of the method for controlling an inverter according to an exemplary embodiment of the present disclosure may be implemented as hardware configured for being electrically connected to the computing device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling an inverter including at least one switching module including a plurality of switching elements connected in parallel in an apparatus of controlling the inverter, the method comprising:

detecting a plurality of currents flowing through the plurality of switching elements of each switching module;

determining, by a controller of the apparatus of controlling the inverter, duty cycles of a plurality of switching mode power supplies (SMPSs) corresponding to the plurality of switching elements based on the plurality of currents flowing through the plurality of switching elements; and controlling, by the controller, the plurality of currents flowing through the plurality of switching elements according to the duty cycles of the plurality of SMPSs, wherein the determining the duty cycles includes:
determining a difference between the current of each switching element and an average of the plurality of currents flowing through the plurality of switching elements;

controlling a duty cycle of an SMPS corresponding to each of the switching elements based on the difference between the current of each switching element and the average.

2. The method of claim 1, wherein the controlling the plurality of currents includes:

decreasing a gate voltage applied to a gate electrode of a corresponding switching element when the duty cycle is decreased; and increasing a gate voltage applied to a gate electrode of a corresponding switching element when the duty cycle is increased.

3. The method of claim 1, wherein the controlling the duty cycle of the SMPS corresponding to each of the switching elements includes:

decreasing a duty cycle of an SMPS corresponding to a switching element in which the difference has a positive value; and increasing a duty cycle of an SMPS corresponding to a switching element in which the difference has a negative value.

4. A non-transitory computer readable storage medium on which a program for performing the method of claim 1 is recorded.

5. An apparatus of controlling an inverter including at least one switching module including a plurality of switching elements connected in parallel, the apparatus comprising:

a controller that is configured to detect a plurality of currents flowing through the plurality of switching elements of each switching module;

a plurality of switching mode power supplies (SMPSs) that correspond to the plurality of switching elements, to determine a plurality of duty cycles according to a plurality of duty commands, respectively, and to control voltages applied to control electrodes of the plurality of switching elements according to the plurality of duty cycles; and a comparator that determines differences between the currents of the plurality of switching elements and an average of the plurality of currents flowing through the plurality of switching elements, wherein the controller connected to the comparator is configured to generate the plurality of duty commands corresponding to the plurality of SMPSs based on the differences.

6. The apparatus of claim 5, wherein the controller is configured to generate a first duty command for reducing a duty cycle of a corresponding SMPS when an amount of current of a first switching element among the plurality of switching elements increases, and to generate a second duty command for increasing a duty cycle of a corresponding SMPS when an amount of current of a second switching element among the plurality of switching elements decreases.

7. The apparatus of claim 6, wherein an SMPS corresponding to the first switching element decreases the voltage applied to a control electrode of the first switching element according to the reduced duty cycle in response to the first duty command, and an SMPS corresponding to the second switching element increases the voltage applied to the control electrode of the second switching element according to the increased duty cycle in response to the second duty command.

8. The apparatus of claim 5, wherein the controller is configured to generate a first duty command for decreasing a duty cycle of an SMPS corresponding to a first switching element in which the difference has a positive value among the plurality of switching elements, and to generate a second duty command for increasing a duty cycle of an SMPS corresponding to a second switching element in which the difference has a negative value among the plurality of switching elements.

9. The apparatus of claim 8, wherein the SMPS corresponding to the first switching element decreases the voltage applied to a control electrode of the first switching element according to the reduced duty cycle in response to the first duty command, and the SMPS corresponding to the second switching element increases the voltage applied to the control electrode of the second switching element according to the increased duty cycle in response to the second duty command.

10. The apparatus of claim 5, wherein the controller is configured for:

determining the average of the plurality of currents and determining the differences between the currents of the plurality of switching elements and the average; and controlling a duty cycle of an SMPS corresponding to each of the switching elements based on the difference between the current of each switching element and the average.

11. The apparatus of claim 10, wherein in the controlling the duty cycle of the SMPS corresponding to each of the switching elements, the controller is configured for:

decreasing a duty cycle of an SMPS corresponding to a switching element in which the difference has a positive value; and increasing a duty cycle of an SMPS corresponding to a switching element in which the difference has a negative value.

* * * * *